Dec. 31, 1935.   H. E. TAUTZ   2,025,834
DRILL PRESS
Filed Aug. 24, 1934
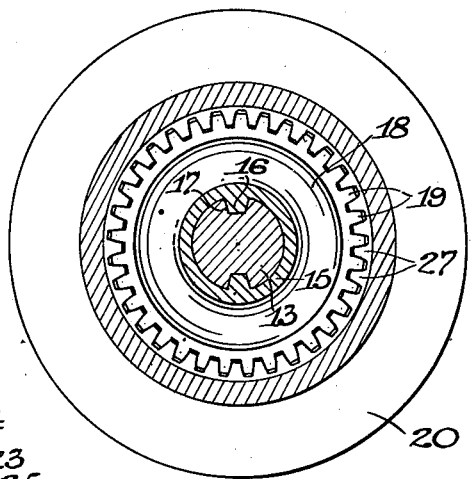
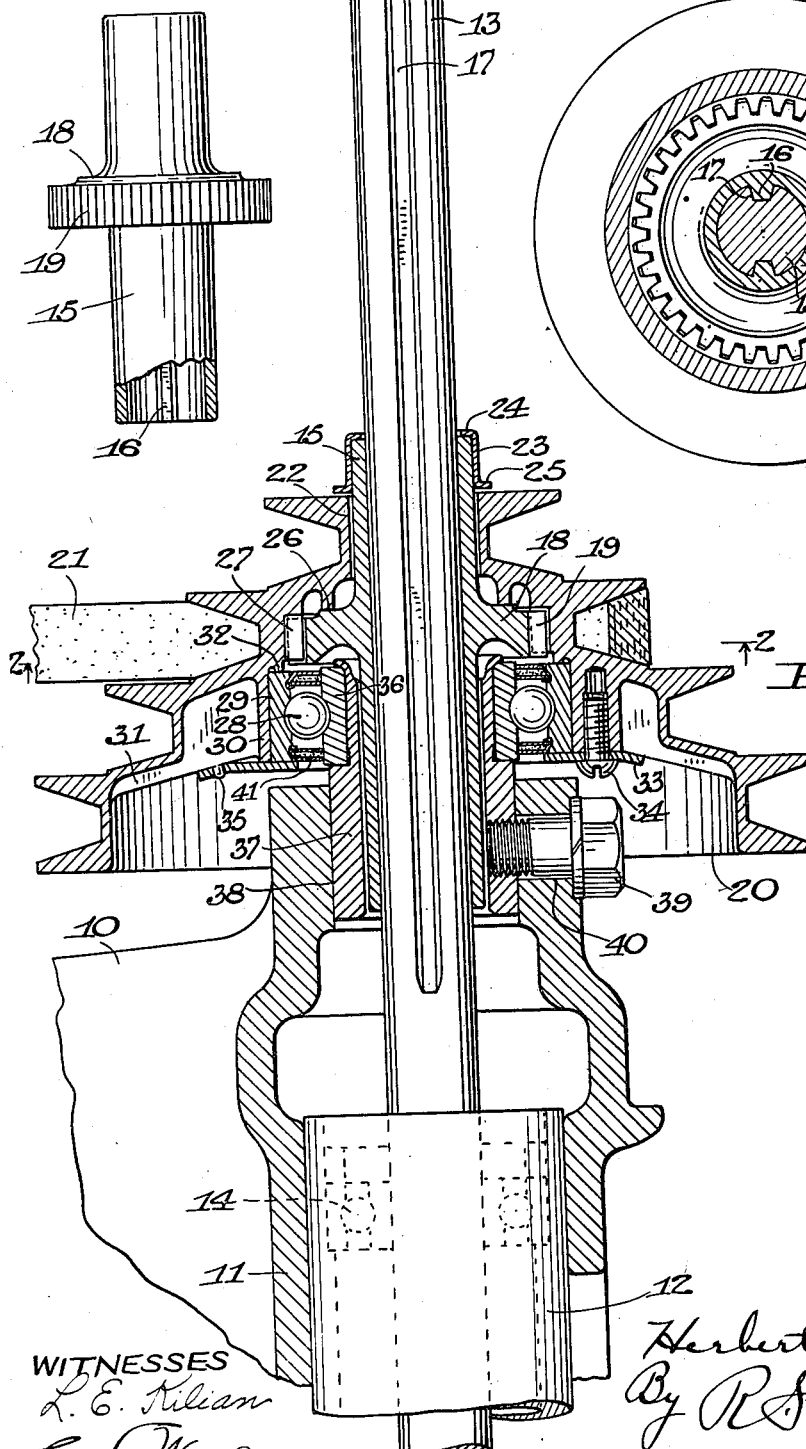
WITNESSES
L. E. Kilian
C. L. Waal
INVENTOR
Herbert E. Tautz
By R. S. C. Caldwell
ATTORNEY Patented Dec. 31, 1935

2,025,834

UNITED STATES PATENT OFFICE 2,025,834

DRILL PRESS

Herbert E. Tautz, Milwaukee, Wis., assignor to The Delta Manufacturing Company, Milwaukee, Wis., a corporation of Wisconsin Application August 24, 1934, Serial No. 741,343

6 Claims. (Cl. 64—9)

The invention relates to drill-presses, and has for an object to provide improved means for supporting and driving a drill-press spindle whereby to permit smooth high speed operation and free reciprocation of the rotating spindle, to effect economies in manufacture, and to facilitate assembly.

The invention further consists in the several features hereinafter described and claimed.

In the accompanying drawing, showing one embodiment of the invention,

Fig. 1 is a vertical sectional view of a drill-press spindle drive constructed in accordance with the invention;

Fig. 2 is a transverse sectional view taken on the line 2—2 of Fig. 1, and

Fig. 3 is a detail view of a spindle driving sleeve, parts being broken away and parts being shown in section.

In the drawing, 10 designates a frame or support having a hollow portion 11 in which a vertical tubular quill 12 slidably fits. A vertical spindle 13 extends axially through the quill and has a rotatable mounting therein as by anti-friction bearings 14, one being shown. The lower end of the spindle carries the usual chuck, not shown. The quill is moved longitudinally in the usual manner to advance the spindle toward the work.

The upper portion of the spindle slidably passes through a sleeve 15 to which it is splined, the sleeve having diametrically opposite internal keys 16 entering keyways 17 in the spindle. The sleeve 15 is preferably of die-cast construction, the keys being integral therewith. The use of diametrically opposite or symmetrically placed keys insures balance at high spindle speeds and avoids damage to the keys and keyways. The driving faces of the keys and keyways are preferably arranged in radial planes, as seen in Fig. 2, thus minimizing wear. At a region approximately midway between its ends, the sleeve is provided with a surrounding flange or rib 18 having spaced peripheral projections 19, here shown to be gear teeth forming an external spur gear co-axial with the sleeve. The gear teeth 19 serve to transmit driving power to the sleeve, as hereinafter described.

The sleeve 15 passes co-axially through a pulley 20, preferably of die-cast construction, and here shown to be of the multiple step type with V-grooves for a V-belt 21. The upper portion of the sleeve passes loosely through a bore 22 in the upper portion of the pulley, and has pressed thereon a ferrule 23 with an inturned top flange 24 engaging the upper end of the sleeve. The ferrule has an out-turned bottom flange 25 engageable with the upper end of the pulley to limit downward movement of the sleeve. The flange 18 of the sleeve is engageable at its upper face with an annular shoulder 26 formed within the pulley to thereby limit upward movement of the sleeve. The sleeve has a slight play with respect to the pulley. The pulley is confined between the shoulders formed by the sleeve flange 18 and the ferrule flange 25. The middle portion of the sleeve is adjacent the middle portion of the pulley.

The gear teeth 19 of the external gear on the sleeve mesh with gear teeth 27 in the pulley, the latter teeth forming an internal gear which is coaxial with and integral with the pulley. The interengaging parts 19 and 27 form a driving connection between the pulley and the sleeve, and provide the effect of a universal joint or flexible coupling, avoiding the necessity for exact alignment of the spindle with respect to the pulley. The external and internal meshing or interfitting gears, which are coaxial and of substantially the same pitch diameter, present numerous equally spaced driving points adjacent the pitch circle.

The pulley 20 is rotatably supported by a ball-bearing 28 located aproximately midway between the ends of the pulley and adjacent the middle portion of the sleeve 15. The outer ball race 29 of the bearing fits in a cylindrical shell 30 froming a part of the pulley and connected to the outer portion of the pulley by radial webs 31. The bearing race 29 is clamped against a shoulder 32 in the pulley by an annular retaining plate 33 secured by screws 34 to enlargements of some of the webs 31. Lugs 35 on other webs enter openings in the plate 33 to position the plate. The inner bearing race 36 is secured to the reduced shouldered upper end of a tube 37, the upper edge of the tube being spun over the upper end of the race. The tube 37 loosely surrounds the lower portion of the sleeve 15 and fits within an upper bore 38 in the frame 10. The tube is secured to the frame by a screw 39 passing through a radial bore 40 in the frame and threaded into the tube. The tube is thus held firmly in place without compression or deformation. The screw 39 is preferably located at the side opposite the direction of belt tension. The ball bearing 28 is here shown to be provided with grease seals 41.

The sleeve 15, pulley 20, bearing 28, and tube 37 form a unitary assembly which is mounted in place by merely slipping the sleeve 15 over the upper end of the spindle, inserting the tube 37 into the frame 10 and tightening the screw 39. The removal of the assembly is equally simple.

In operation, the belt 20 is applied to a selected pulley groove and is driven by any suitable source of power to rotate the pulley. The pulley drives the sleeve 15 by means of the interengaging teeth 19 and 27, and the sleeve in turn drives the spindle 13 by its splined connection therewith. The radial load on the pulley caused by the pull of the belt is taken by the pulley bearing 28 and not by the spindle, thus permitting free, sensitive operation of the spindle.

The relations between the spindle, sleeve and pulley are such as to permit smooth high-speed operation, and it is not necessary to provide exact alignment between the spindle and the pulley. A further advantage is that only a single bearing is required for the pulley. The construction permits the use of a long spindle-driving sleeve which minimizes wear and allows a die-cast sleeve to be successfully used. The interengaging parts of the sleeve and pulley are economically produced by the die-casting process. The relation of the sleeve to the spindle and pulley serves to minimize or prevent torsional vibration or whip of the spindle.

While the invention is here shown to be embodied in a drill-press, it is also applicable to other machines employing a reciprocatory spindle.

What I claim as new and desire to secure by Letters Patent is:

1. In combination, a support, a pulley rotatably carried by said support, a sleeve loosely mounted in said pulley in substantially co-axial relation therewith and having a surrounding enlargement at an intermediate portion provided with spaced projections, said pulley having sleeve-driving parts engageable with said projections, and a spindle axially slidable in said sleeve and having a driving connection with said sleeve.

2. A driving unit for a reciprocatory spindle, comprising, in combination, a tubular member adapted to be secured to a support, a pulley rotatably carried by said tubular member, and a spindle-driving sleeve loosely mounted in said pulley in substantially co-axial relation therewith, said pulley and sleeve having engaging parts to form a driving connection between them, and said sleeve having axially spaced shoulders loosely confining a portion of said pulley between them.

3. In combination, a pulley, a spindle-driving sleeve loosely mounted in said pulley in substantially co-axial relation therewith, said pulley and sleeve having engaging parts to form a driving connection between them, said sleeve having a shoulder between its ends engageable with a shoulder in said pulley to limit relative axial movement of said sleeve in one direction, a shoulder-forming member carried on said sleeve for engagement with said pulley and co-operating with said shoulders to loosely confine said sleeve with respect to said pulley, and means for rotatably supporting said pulley.

4. In combination, a support, a tubular member secured to said support, a bearing race carried by said tubular member, a pulley, a bearing race in said pulley surrounding said first-named race, rollable bearing members between said races, a sleeve loosely confined in said pulley in substantially co-axial relation therewith and extending into said tubular member, said pulley and sleeve having engaging parts adjacent the bearing races to form a driving connection between said pulley and sleeve, and a spindle axially slidable in said sleeve and having a driving connection with said sleeve.

5. In combination, a support, having a bore, a tubular member having a portion detachably fitting in said bore and having a bearing portion at its outer side, a spindle extending through said tubular member, a rotary member having a driving connection with said spindle and rotatably mounted on the bearing portion of said tubular member, and a fastening screw for said tubular member urging said tubular member laterally against said bore at the side of said bore adjacent the screw to thereby prevent compression and deformation of said tubular member and its bearing portion.

6. In combination, a support, a rotatable member carried by said support and having an internal gear therin, a sleeve losely mounted in said rotatable member in substantially coaxial relation therewith and having an external gear theron meshing into said internal gear to form a driving connection therewith, said gears being coaxial and having substantially equal pitch diameters, and a spindle axially slidable in said sleeve and having a driving connection with said sleeve.

HERBERT E. TAUTZ.